(12) United States Patent
Mamyoda et al.

(10) Patent No.: US 11,128,003 B2
(45) Date of Patent: Sep. 21, 2021

(54) SECONDARY BATTERY AND METHOD OF RECYCLING SECONDARY BATTERY

(71) Applicant: KABUSHIKI KAISHA TOSHIBA, Minato-ku (JP)

(72) Inventors: Hirokiyo Mamyoda, Kashiwazaki (JP); Tatsuya Hashimoto, Kashiwazaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 16/799,934

(22) Filed: Feb. 25, 2020

(65) Prior Publication Data
US 2020/0194740 A1    Jun. 18, 2020

Related U.S. Application Data

(63) Continuation of application No. PCT/JP2017/047023, filed on Dec. 27, 2017.

(51) Int. Cl.
*H01M 2/02*      (2006.01)
*H01M 2/04*      (2006.01)
(Continued)

(52) U.S. Cl.
CPC ......... *H01M 50/116* (2021.01); *H01M 10/54* (2013.01); *H01M 50/155* (2021.01); *H01M 50/30* (2021.01); *H01M 50/131* (2021.01)

(58) Field of Classification Search
CPC combination set(s) only.
See application file for complete search history.

(56) References Cited

U.S. PATENT DOCUMENTS 4,934,046 A * 6/1990 Sindorf ............... H01M 50/172
29/623.1
10,461,369 B2   10/2019 Negishi et al.
(Continued)

FOREIGN PATENT DOCUMENTS

EP      1 111 696 A2    6/2001
EP      3 309 869 A1    4/2018
(Continued)

OTHER PUBLICATIONS

Supplementary European Search Report dated Jun. 18, 2021, in corresponding European Patent Application No. EP 17 93 6152.
(Continued)

*Primary Examiner* — Kaity V Chandler
(74) *Attorney, Agent, or Firm* — Oblon, McClelland, Maier & Neustadt, L.L.P.

(57) ABSTRACT

According to one embodiment, in a secondary battery, a first container member has an accommodating space defined by a bottom wall and side walls, and includes a flange, defining an edge of the opening of the accommodating space, at a portion opposite to the bottom wall. The electrode group is accommodated in the accommodating space, and the second container member is arranged to face the flange. A welding part, provided on an outer side relative to the edge of the opening, hermetically welds the flange and the second container member to seal the accommodating space. A projection, provided on one of the flange and the second container member between the welding part and the edge of the opening, projects toward another of the flange and the second container member.

8 Claims, 10 Drawing Sheets

(51) Int. Cl.
    *H01M 10/54*     (2006.01)
    *H01M 2/12*     (2006.01)
    *H01M 50/116*     (2021.01)
    *H01M 50/30*     (2021.01)
    *H01M 50/155*     (2021.01)
    *H01M 50/131*     (2021.01)

(56) References Cited

U.S. PATENT DOCUMENTS

| | | | |
|---|---|---|---|
| 2003/0180609 A1* | 9/2003 | Yamashita | H01M 50/543 |
| | | | 429/185 |
| 2004/0180260 A1 | 9/2004 | Somatomo et al. | |
| 2007/0054172 A1* | 3/2007 | Ueda | H01M 8/2475 |
| | | | 429/468 |
| 2015/0171406 A1* | 6/2015 | Bazzarella | H01M 50/124 |
| | | | 429/120 |

FOREIGN PATENT DOCUMENTS

| | | | |
|---|---|---|---|
| JP | 2003-142043 A | | 5/2003 |
| JP | 2004-103369 | | 4/2004 |
| JP | 2010-113869 A | | 5/2010 |
| JP | 2017-126537 A | | 7/2017 |
| WO | WO 2012141268 | * | 10/2012 |
| WO | WO 2012141268 A1 | * | 10/2012 |
| WO | WO 2016076427 | * | 5/2016 |
| WO | WO 2016/204147 A1 | | 12/2016 |

OTHER PUBLICATIONS

International Search Report dated Feb. 27, 2018 in PCT/JP2017/047023 filed Dec. 27, 2017, 1 page.

* cited by examiner

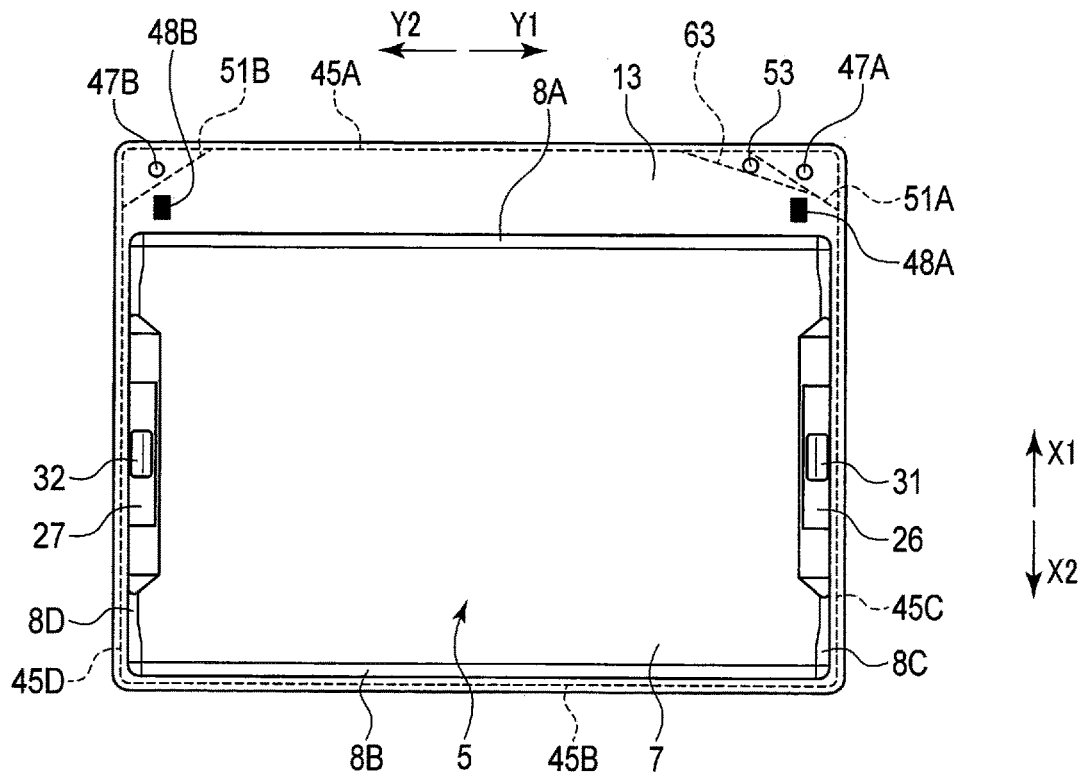
F I G. 11
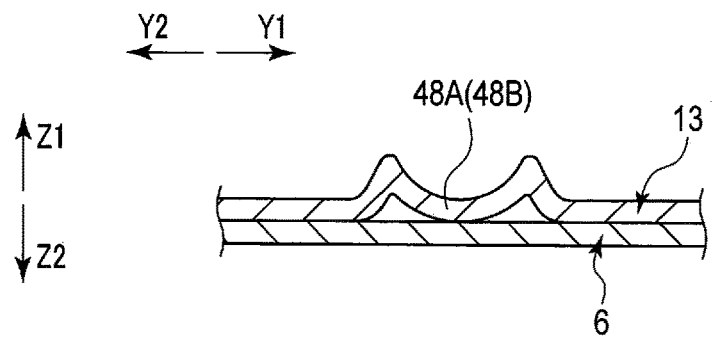
F I G. 12
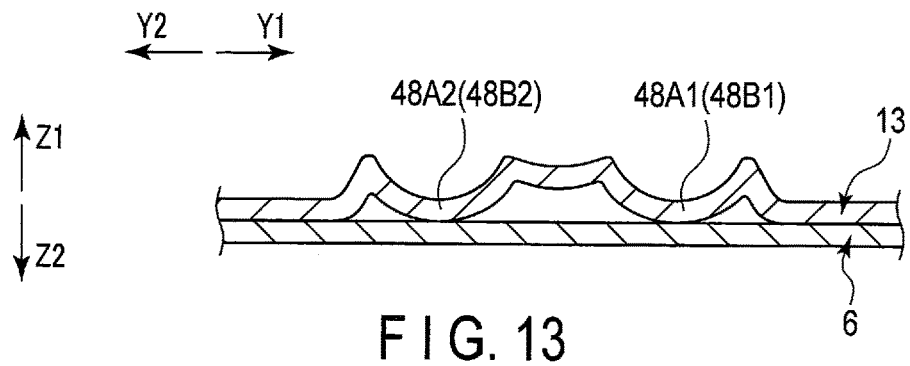
F I G. 13

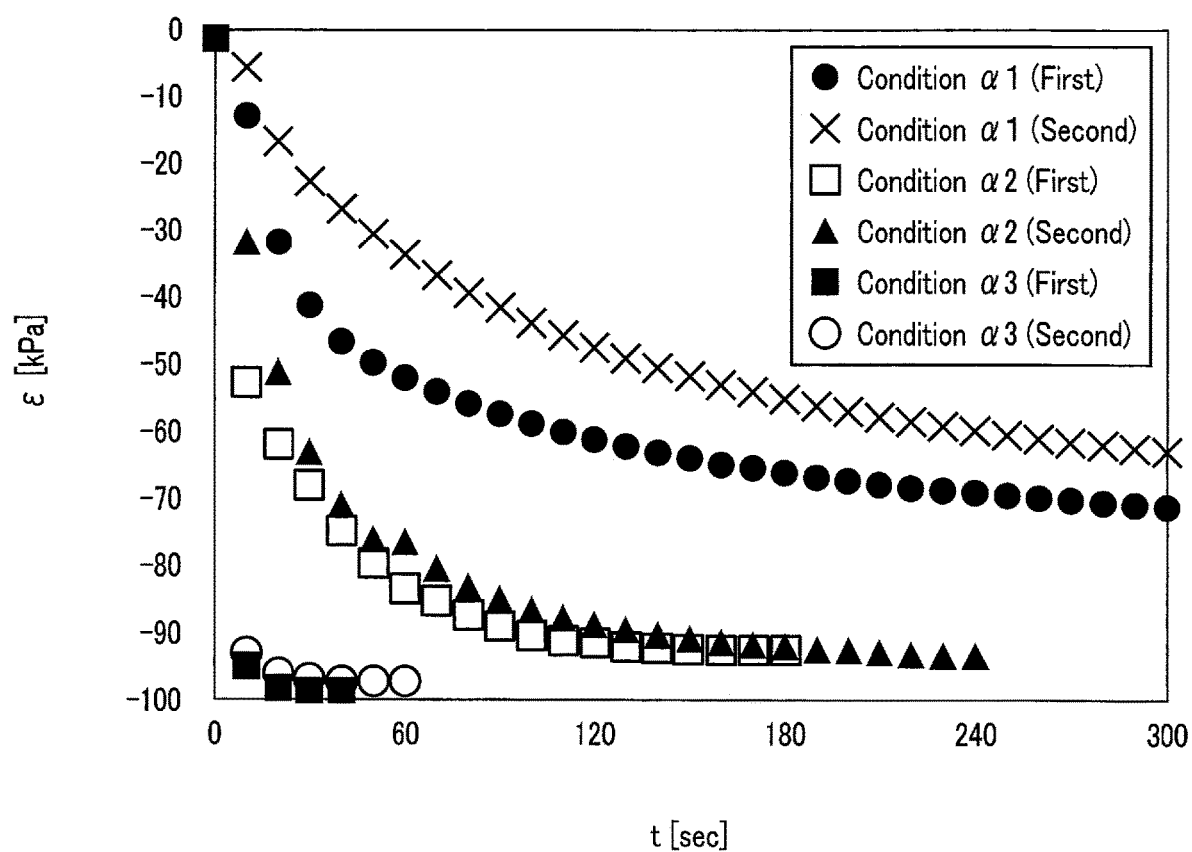
F I G. 15

SECONDARY BATTERY AND METHOD OF RECYCLING SECONDARY BATTERY

CROSS-REFERENCE TO RELATED APPLICATIONS

This is a Continuation Application of PCT Application No. PCT/JP2017/047023, filed Dec. 27, 2017, the entire contents of which are incorporated herein by reference.

FIELD

Embodiments described herein relate generally to a secondary battery and a method of recycling the secondary battery.

BACKGROUND

Generally, a secondary battery includes an electrode group including a positive electrode and a negative electrode, and a container that accommodates the electrode group. There is a secondary battery in which a container is composed of two container members, each of which is made of stainless steel. In such a secondary battery, the first container member, which is one of the container members, is formed in a tubular shape with a bottom provided with a bottom wall and side walls, and an accommodating space that accommodates an electrode group is defined by the bottom wall and the side walls. The accommodating space has an opening opposite to the bottom wall. In the first container member, a flange is formed at a portion opposite to the bottom wall, and an edge of the opening of the accommodating space is defined by the flange. In such a secondary battery, the second container member is arranged to face the flange, and closes the opening of the accommodating space. In addition, a welding part where the flange and the second container member are hermetically welded is formed outer side relative to the edge of the opening. The welding part is formed over the entire perimeter of the opening. The accommodating space is sealed off from the outside by the welding part.

In the secondary battery as described above, gas may be generated in the accommodating space that accommodates the electrode group, for example, in a case of use for a long time. When gas is generated, the gas may have an influence on the performance, etc. of the secondary battery.

BRIEF DESCRIPTION OF THE DRAWINGS

FIG. 11 is a schematic diagram showing a state in which a welding part is formed between the opening hole from which the gas is discharged and the projection in the recycling of the secondary battery according to the first embodiment.

FIG. 12 is a cross-sectional view schematically showing the V1-V1 cross section of FIG. 6A in a state in which the internal pressure inside the container is lower than the external pressure outside the container in the first example.

FIG. 13 is a cross-sectional view schematically showing the V3-V3 cross section of FIG. 7A in a state in which the internal pressure inside the container is lower than the external pressure outside the container in the second example.

FIG. 15 is a schematic diagram showing a measurement result of a change of a decompression degree of a subject's accommodating space over time in the verification using the system of FIG. 14.

DETAILED DESCRIPTION

According to one embodiment, a secondary battery includes a first container member, a second container member, and an electrode group. The first container member includes a bottom wall and side walls, and is made of stainless steel. An accommodating space is defined by the bottom wall and the side walls in the first container member, and the accommodating space has an opening opposite to the bottom wall. A flange is provided at a portion opposite to the bottom wall in the first container member, and the flange defines an edge of the opening of the accommodating space. The electrode group includes a positive electrode and a negative electrode, and is accommodated in the accommodating space. The second container member is made of stainless steel, and is arranged to face the flange so as to close the opening of the accommodating space. A welding part is provided on an outer side relative to the edge of the opening, and hermetically welds the flange and the second container member over an entire perimeter of the opening so as to seal the accommodating space. A projection is provided on one of the flange and the second container member between the welding part and the edge of the opening, and projects toward another of the flange and the second container member.

Hereinafter, an embodiment will be described with reference to FIGS. 1 to 15.

First Embodiment

Figure 1:
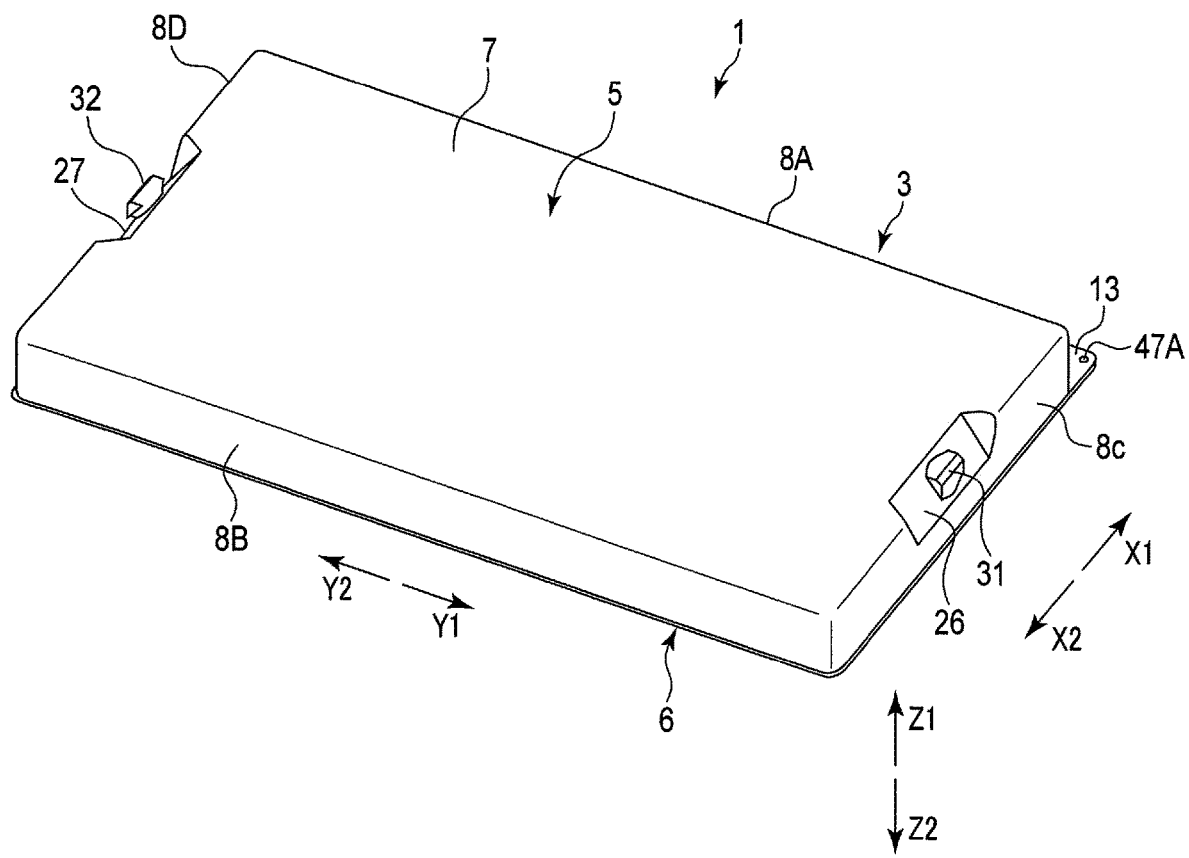
FIG. 1 is a perspective view schematically showing a secondary battery according to a first embodiment.

FIG. 1 shows a secondary battery 1 according to a first embodiment. The secondary battery 1 is, for example, a nonaqueous electrolyte battery. As shown in FIG. 1, the secondary battery 1 includes a container 3. The container 3 is formed of a first container member 5 and a second container member 6. Each of the container members 5 and 6 is made of stainless steel. The first container member 5 is formed in a tubular shape with a bottom. In this embodiment, the first container member 5 has a bottom wall 7 and four side walls 8A to 8D, and is formed in an approximately rectangular tubular shape with a bottom. In the first container member 5, an accommodating space 11 is defined by the bottom wall 7 and the side walls 8A to 8D. An electrode group 10 is accommodated in the accommodating space 11.

Figure 2:
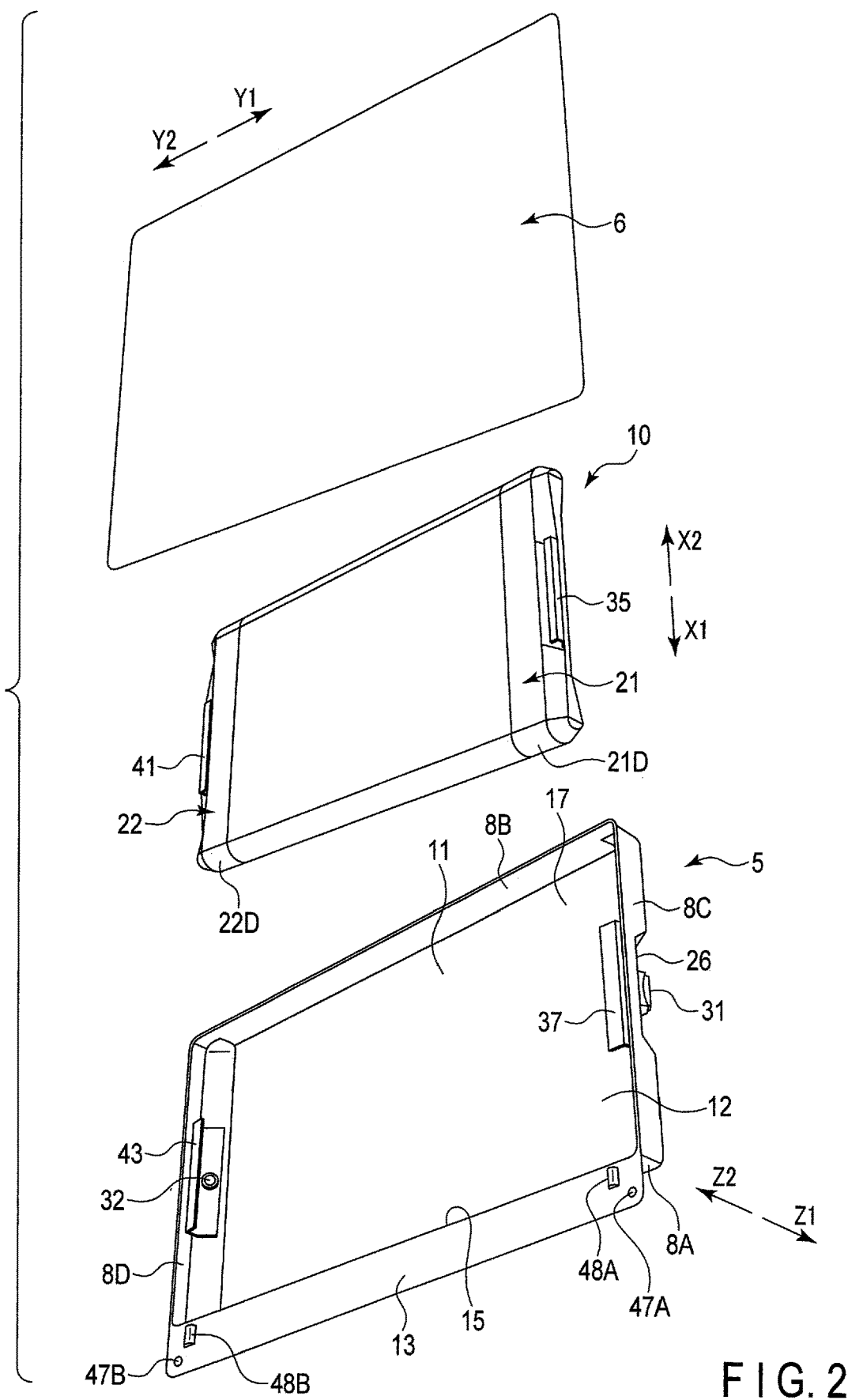
FIG. 2 is a perspective view schematically showing a first container member, a second container member, and an electrode group according to the first embodiment in a state in which they are disassembled from one another.

FIG. 2 shows the first container member 5, the second container member 6 and the electrode group 10 in a state in which they are disassembled from one another. As shown in FIG. 2, the accommodating space 11 has an opening 12 opposite to the bottom wall 7. Here, in the secondary battery 1, a depth direction (direction indicated by arrows X1 and X2), a lateral direction (direction indicated by arrows Y1 and Y2) perpendicular to or approximately perpendicular to the depth direction, and a thickness direction (direction indicated by arrows Z1 and Z2) perpendicular to or approximately perpendicular to the depth direction and perpendicular to or approximately perpendicular to the lateral direction, are defined. In the secondary battery 1, the side walls 8A and 8B are spaced apart from each other in the depth direction across the accommodating space 11, and the side walls 8C and 8D are spaced apart from each other in the lateral direction across the accommodating space 11. Each of the side walls 8A to 8D is extended along the thickness direction from the bottom wall 7 toward the opening 12, and the accommodating space 11 opens toward one side (the arrow Z2 side) in the thickness direction at the opening 12.

In the first container member 5, a flange 13 is provided at a portion opposite to the bottom wall 7. The flange 13 projects outward, i.e., away from the opening 12, with respect to the side walls 8A to 8D. Then, the flange defines an edge 15 of the opening 12 over the entire perimeter in the circumferential direction of the opening 12. In this embodiment, the second container member 6 is formed in a plate shape, and is, for example, an approximately rectangular plate member. The second container member 6 is arranged to face the flange 13, and faces the flange 13 from a side where the opening 12 opens. In this embodiment, the second container member 6 projects outward, i.e., away from the opening 12, with respect to the side walls 8A to 8D, over the entire perimeter in the circumferential direction of the opening 12. Thus, in an area outer side relative to the edge 15 of the opening 12, the second container member 6 faces the flange 13 over the entire perimeter in the circumferential direction of the opening 12. The second container member 6 is arranged in a state in which a thickness direction of the plate-like second container member 6 coincides with or approximately coincides with the thickness direction of the secondary battery 1. By arranging the second container member 6 as described above, the second container member 6 closes the opening 12 of the accommodating space 11.

In the first container member 5, a distance from the bottom wall 7 to the opening 12 is much smaller than each of a distance between the side walls 8A and 8B and a distance between the side walls 8C and 8D. Thus, in the secondary battery 1, a dimension in the thickness direction is much smaller than each of a dimension in the depth direction and a dimension in the lateral direction. In this embodiment, the distance between the side walls 8A and 8B is smaller than the distance between the side walls 8C and 8D, and in the secondary battery 1, the dimension in the depth direction is smaller than the dimension in the lateral direction. The thickness of the first container member 5 is from 0.02 mm to 0.3 mm in each of the bottom wall 7, the side walls 8A to 8D, and the flange 13. The thickness of the plate-like second container member 6 is from 0.02 mm to 0.3 mm.

Figure 3:
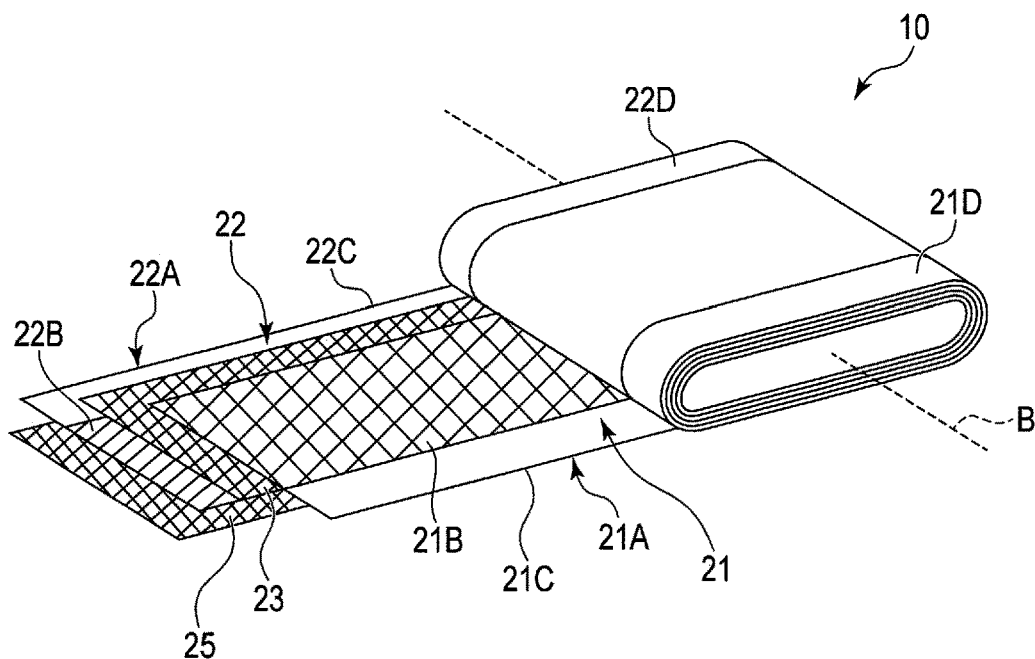
FIG. 3 is a schematic diagram for explaining a configuration of the electrode group according to the first embodiment.

FIG. 3 is a diagram for explaining a configuration of the electrode group 10. As shown in FIG. 3, the electrode group 10 is formed in, for example, a flat shape, and includes a positive electrode 21, a negative electrode 22, and separators 23 and 25. The positive electrode 21 includes a positive electrode current collecting foil 21A serving as a positive electrode current collector, and a positive electrode active material-containing layer 21B supported on a surface of the positive electrode current collecting foil 21A. The positive electrode current collecting foil 21A is an aluminum foil or an aluminum alloy foil, etc., and has a thickness of about 10 μm to 20 μm. A slurry containing a positive electrode active material, a binder, and an electro-conductive agent is applied to the positive electrode current collecting foil 21A. The positive electrode active material may be, but is not limited to, an oxide, a sulfide, and a polymer, which can occlude and release lithium, for example. For the positive electrode active material, it is preferable to use a lithium-manganese composite oxide, a lithium-nickel composite oxide, a lithium-cobalt composite oxide, and lithium iron phosphate, for example, since a high positive electrode electric potential can be obtained.

The negative electrode 22 includes a negative electrode current collecting foil 22A serving as a negative electrode current collector, and a negative electrode active material-containing layer 22B supported on a surface of the negative electrode current collecting foil 22A. The negative electrode current collecting foil 22A is an aluminum foil, an aluminum alloy foil, or a copper foil, and has a thickness of about 10 μm to 20 μm. A slurry containing a negative electrode active material, a binder, and a conductive agent is applied to the negative electrode current collecting foil 12A. The negative electrode active material may be, but is not limited to, a metal oxide, a metal sulfide, a metal nitride, and a carbon material, which can occlude and release lithium ions, for example. The negative electrode active material is preferably a substance which occludes and releases lithium ions at an electric potential of 0.4 V or more with respect to a metal lithium electric potential, i.e., a substance which occludes and releases lithium ions at an electric potential of 0.4V (vs. Li+/Li) or more. The reaction of aluminum or an aluminum alloy with lithium is suppressed by using the negative electrode active material having a lithium ion occlusion-and-release electric potential as described above, which allows usage of aluminum and an aluminum alloy for the negative electrode current collecting foil 22A and a structural member related to the negative electrode 22. Examples of a negative electrode active material having a lithium ion occlusion-and-release electric potential of 0.4V (vs. Li+/Li) or more are a titanium oxide, a lithium titanium composite oxide such as a lithium titanate, a tungsten oxide, an amorphous tin oxide, a niobium titanium composite oxide, a tin silicon oxide, and a silicon oxide, and it is particularly preferable to use a lithium titanium composite oxide as the negative electrode active material. When a carbon material which occludes and releases lithium ions is used as the negative electrode active material, a copper foil may be used as the negative electrode current collecting foil 22A. The carbon material used as the negative electrode active material has a lithium ion occlusion-and-release electric potential of about 0V (vs. Li+/Li).

The aluminum alloy used for the positive electrode current collecting foil 21A and the negative electrode current collecting foil 22A preferably includes one or more kinds of elements selected from Mg, Ti, Zn, Mn, Fe, Cu and Si. The purity of the aluminum and the aluminum alloy may be set to 98% by weight or more, and is preferably 99.99% by weight or more. Pure aluminum having a purity of 100% can be used as a material for the positive electrode current collector and/or the negative electrode current collector. It is preferable to set the contained amount of transition metal such as nickel and chrome in the aluminum and the aluminum alloy to 100 ppm by weight or less (including 0 ppm by weight).

In the positive electrode current collecting foil 21A, a positive electrode current collecting tab 21D is formed by one long edge 21C and its nearby portion. In this embodiment, the positive electrode current collecting tab 21D is formed over the entire length of the long edge 21C. In the positive electrode current collecting tab 21D, the positive electrode active material-containing layer 21B is not supported on the surface of the positive electrode current collecting foil 21A. In the negative electrode current collecting foil 22A, a negative electrode current collecting tab 22D is formed by one long edge 22C and its nearby portion. In this embodiment, the negative electrode current collecting tab 22D is formed over the entire length of the long edge 22C. In the negative electrode current collecting tab 22D, the negative electrode active material-containing layer 22B is not supported on the surface of the negative electrode current collecting foil 22A.

Each of the separators 23 and 25 is made of an electrically insulating material, and electrically insulates between the positive electrode 21 and the negative electrode 22. Each of the separators 23 and 25 may be a separate sheet from the positive electrode 21 and the negative electrode 22, etc., and may be formed integrally with one of the positive electrode 21 and the negative electrode 22. The separators 23 and 25 may be made of an organic material, may be made of an inorganic material, or may be made of a mixture of an organic material and an inorganic material. Organic materials that form the separators 23 and 25 include engineering plastics and super engineering plastics. Examples of engineering plastics include polyamide, polyacetal, polybutylene terephthalate, polyethylene terephthalate, syndiotactic polystyrene, polycarbonate, polyamideimide, polyvinyl alcohol, polyvinylidene fluoride, modified polyphenylene ether, etc. Examples of super engineering plastics include polyphenylene sulfide, polyether ether ketone, liquid crystal polymer, polyvinylidene fluoride, polytetrafluoroethylene (PTFE), polyether nitrile, polysulfone, polyacrylate, polyetherimide, thermoplastic polyimide, etc. Examples of inorganic materials forming the separators 23 and 25 include oxides (e.g., aluminum oxide, silicon dioxide, magnesium oxide, phosphorus oxide, calcium oxide, iron oxide, titanium oxide), nitrides (e.g., boron nitride, aluminum nitride, silicon nitride, barium nitride), etc.

In the electrode group 10, the positive electrode 21, the negative electrode 22, and the separators 23 and 25 are wound around a winding axis B into a flat shape with the separators 23 and 25 being interposed between the positive electrode active material-containing layer 21B and the negative electrode active material-containing layer 22B, respectively. At this time, for example, the positive electrode 21, the separator 23, the negative electrode 22, and the separator 25 are wound together with being stacked in this order. In the electrode group 10, the positive electrode current collecting tab 21D of the positive electrode current collecting foil 21A projects to one side in a direction along the winding axis B with respect to the negative electrode 22 and the separators 23 and 25. The negative electrode current collecting tab 22D of the negative electrode current collecting foil 22A projects to the opposite side to the side where the positive electrode current collecting tab 21D projects in the direction along the winding axis B with respect to the positive electrode 21 and the separators 23 and 25. The electrode group 10 is arranged in a state in which the winding axis B is parallel to or approximately parallel to the lateral direction of the secondary battery 1.

In an example, an electrolytic solution (not shown) is impregnated into the electrode group 10 in the accommodating space 11. As an electrolytic solution, a nonaqueous electrolytic solution is used, and, for example, a nonaqueous electrolytic solution prepared by dissolving an electrolyte into an organic solvent is used. In this case, as the electrolyte to be dissolved into the organic solvent, lithium salts, for example, perchlorate lithium (LiClO$_4$), hexafluorophosphate lithium (LiPF$_6$), tetrafluoroborate lithium (LiBF$_4$), hexafluoro lithium (LiAsF$_6$), trifluoro methan sulfonate lithium (LiCF$_3$SO$_3$), and lithium bis(trifluoromethylsulphonyl)imide [LiN(CF$_3$SO$_2$)$_2$], and any mixtures thereof may be used. Examples of the organic solvent include: cyclic carbonate, such as propylene carbonate (PC), ethylene carbonate (EC), or vinylene carbonate; chain carbonate, such as diethyl carbonate (DEC), dimethyl carbonate (DMC), or methyl ethyl carbonate (MEC); cyclic ether, such as tetrahydrofuran (THF), 2-methyltetrahydrofuran (2MeTHF), and dioxolane (DOX); chain ether, such as dimethoxyethane (DME) and diethoxyethane (DEE); γ-butyrolactone (GBL), acetonitryl (AN), and sulfolane (SL). These organic solvents may be used individually or as a mixed solvent.

In an example, a gel nonaqueous electrolyte which is a composite of a nonaqueous electrolytic solution and a polymeric material is used as an electrolytic solution. In this case, the electrolyte and the organic solvent described above are used. Examples of the polymeric material include polyvinylidene fluoride (PVdF), polyacrylonitrile (PAN) and polyethylene oxide (PEO).

In an example, a solid electrolyte, such as a polymeric solid electrolyte and an inorganic solid electrolyte, is provided as a nonaqueous electrolyte, instead of an electrolytic solution. In this case, the separators 23 and 25 may not be provided in the electrode group 10. In the electrode group 10, instead of the separators 23 and 25, the solid electrolyte is sandwiched between the positive electrode 21 and the negative electrode 22. Therefore, in this example, the positive electrode 21 and the negative electrode 22 are electrically insulated from each other by the solid electrolyte.

As shown in FIGS. 1 and 2, an inclined surface 26 is provided between the bottom wall 7 and the side wall 8C on an outer surface of the first container member 5. An inclined surface 27 is provided between the bottom wall 7 and the side wall 8D on the outer surface of the first container member 5. In the first container member 5, a positive electrode terminal 31 is attached to the inclined surface 26, and a negative electrode terminal 32 is attached to the inclined surface 27. Each of the terminals 31 and 32 is made of a conductive material, and for example, is made of any one of aluminum, copper, stainless steel, etc.

Figure 4:
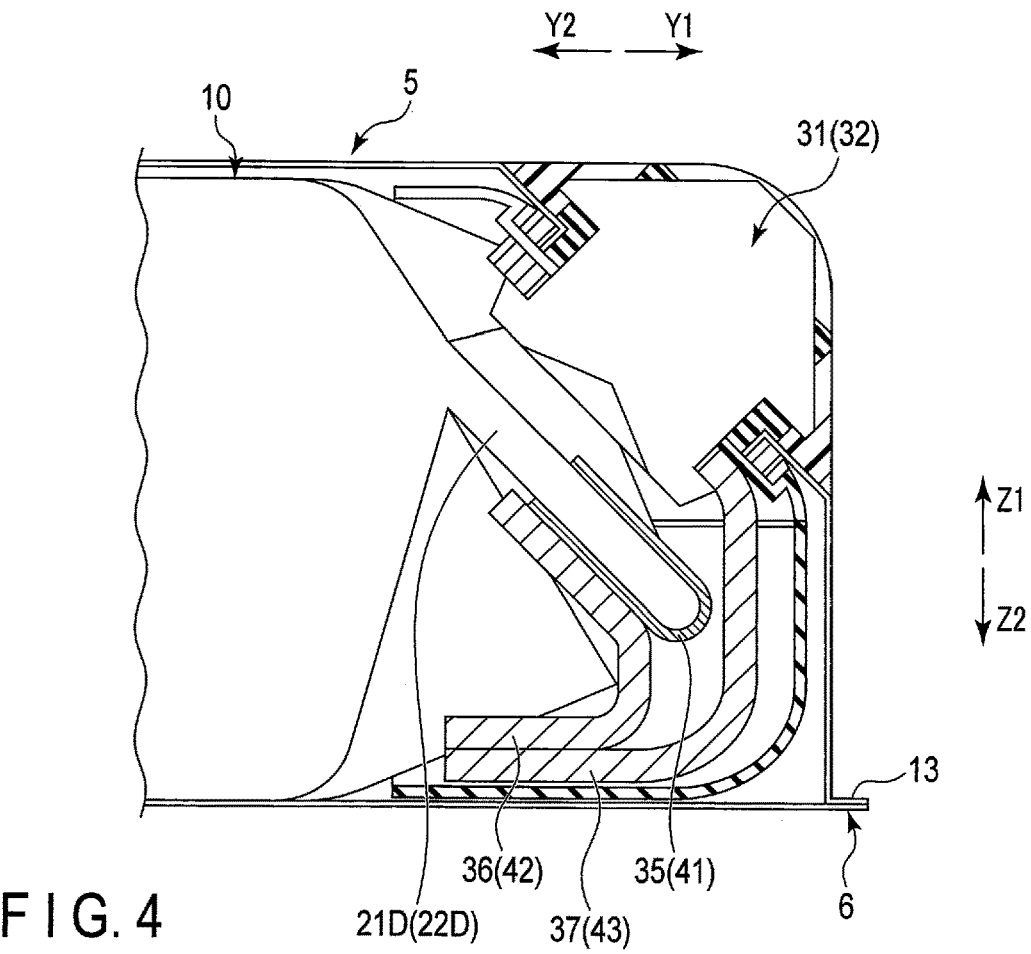
FIG. 4 is a schematic diagram showing a configuration of an electrical connection to a positive electrode terminal (a negative electrode terminal) of the electrode group in the first embodiment.

FIG. 4 shows a configuration of an electrical connection to the positive electrode terminal 31 (negative electrode terminal 32) of the electrode group 10. As shown in FIG. 4, the positive electrode current collecting tab 21D of the electrode group 10 is bundled by welding such as ultrasonic welding, and the bundle of the positive electrode current collecting tab 21D is connected to a positive electrode backup lead 35 by welding such as ultrasonic welding. The positive electrode backup lead 35 is connected to a positive electrode lead 36 by welding such as ultrasonic welding, and the positive electrode lead 36 is connected to a positive electrode terminal lead 37 by welding such as ultrasonic welding. Then, the positive electrode terminal lead 37 is connected to the positive electrode terminal 31. Each of the positive electrode backup lead 35, the positive electrode lead 36, and the positive electrode terminal lead 37 is made of a conductive material. Therefore, the positive electrode current collecting tab 21D is electrically connected to the positive electrode terminal 31 via the positive electrode backup lead 35, the positive electrode lead 36, and the positive electrode terminal lead 37. Each of the positive electrode current collecting tab 21D, the positive electrode backup lead 35, the positive electrode lead 36, the positive electrode terminal lead 37 and the positive electrode terminal 31 is electrically insulated from the container members 5 and 6.

Similarly, the negative electrode current collecting tab 22D of the electrode group 10 is bundled by welding such as ultrasonic welding, and the bundle of the negative electrode current collecting tab 22D is connected to a negative electrode backup lead 41 by welding such as ultrasonic welding. The negative electrode backup lead 41 is connected to a negative electrode lead 42 by welding such as ultrasonic welding, and the negative electrode lead 42 is connected to a negative electrode terminal lead 43 by welding such as ultrasonic welding. The negative electrode terminal lead 43 is connected to the negative electrode terminal 32. Each of the negative electrode backup lead 41, the negative electrode lead 42, and the negative electrode terminal lead 43 is made of a conductive material. Accordingly, the negative electrode current collecting tab 22D is electrically connected to the negative electrode terminal 32 via the negative electrode backup lead 41, the negative electrode lead 42, and the negative electrode terminal lead 43. Each of the negative electrode current collecting tab 22D, the negative electrode backup lead 41, the negative electrode lead 42, the negative electrode terminal lead 43, and the negative electrode terminal 32 is electrically insulated from the container members 5 and 6.

Figure 5:
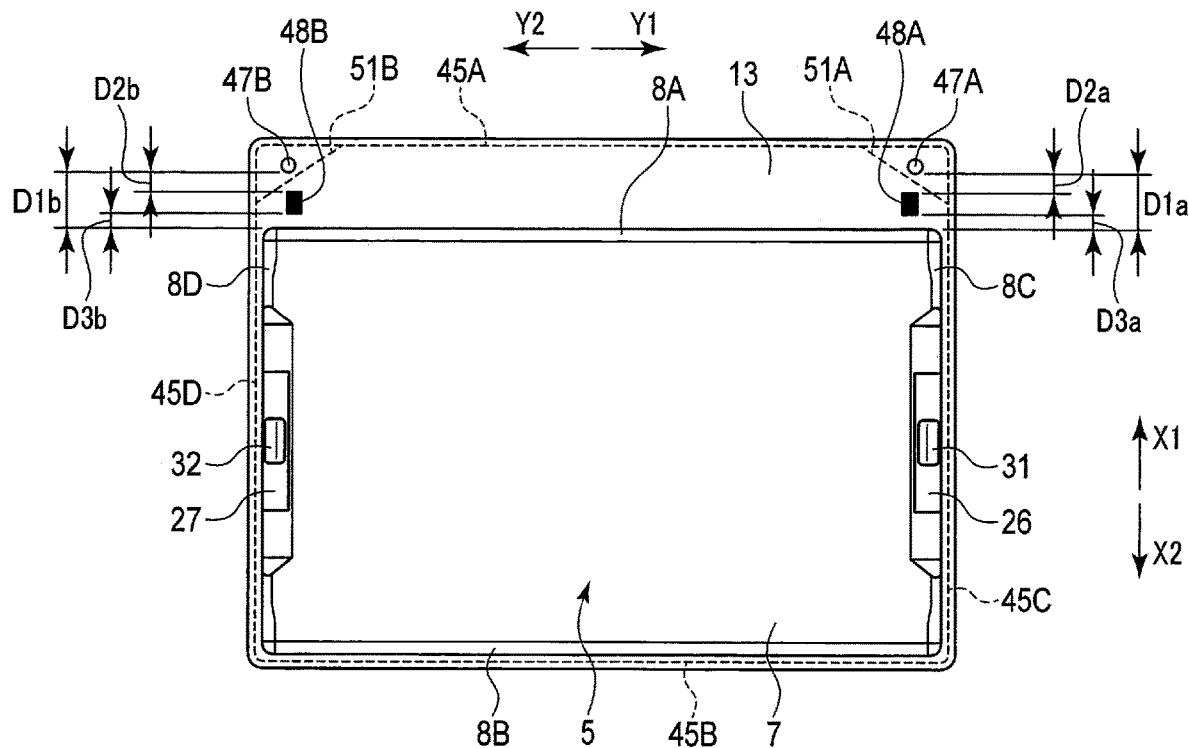
FIG. 5 is a schematic diagram showing the secondary battery according to the first embodiment in a state of being observed from a side where a bottom wall of the first container member is located in the thickness direction.

FIG. 5 shows the secondary battery 1 in a state of being observed from a side where the bottom wall 7 of the first container member 5 is located in the thickness direction. As shown in FIG. 5, welding parts 45A to 45D which hermetically weld the flange 13 and the second container member 6 are formed in the secondary battery 1. Each of the welding parts 45A to 45D is provided on the outer side relative to the edge 15 of the opening 12, i.e., on a side away from the opening 12 with respect to the edge 15. In this embodiment, in the flange 13 and the second container member 6, the welding part 45A is formed at a portion protruding outward from the side wall 8A in the depth direction, and is extended along the lateral direction. In the flange 13 and the second container member 6, the welding part 45B is formed at a portion protruding outward from the side wall 8B in the depth direction, and is extended along the lateral direction. In the flange 13 and the second container member 6, the welding part 45C is formed at a portion protruding outward from the side wall 8C in the lateral direction, and is extended along the depth direction. In the flange 13 and the second container member 6, the welding part 45D is formed at a portion protruding outward from the side wall 8D in the lateral direction, and is extended along the depth direction. In the figures observing the secondary battery 1 from one side of the thickness direction, such as FIG. 5, the welding parts 45A to 45D are indicated by broken lines.

One end of the welding part 45A is continuous with the welding part 45C, and the other end thereof is continuous with the welding part 45D. One end of the welding part 45B is continuous with the welding part 45C, and the other end thereof is continuous with the welding part 45D. Therefore, the flange 13 and the second container member 6 are hermetically welded to each other over the entire perimeter in the circumferential direction of the opening 12 by the welding parts 45A to 45D. In the welding parts 45A to 45D, for example, the flange 13 and the second container member 6 are welded by resistance seam welding. By performing the resistance seam welding, the cost can be suppressed and a high airtightness between the flange 13 and the second container member 6 can be obtained as compared with laser welding, etc.

In this embodiment, opening holes 47A and 47B are formed in one of the flange 13 and the second container member 6. In an example, in the flange 13 or the second container member 6, the opening holes 47A and 47B are formed at the portion protruding outward from the side wall 8A in the depth direction. The opening holes 47A and 47B are provided between the welding part 45A and the edge 15 of the opening 12. That is, the opening holes 47A and 47B are located on an inner side, i.e., a side close to the opening 12, with respect to the welding part 45A. The opening hole (first opening hole) 47A is formed at an end portion close to the side wall 8C in the lateral direction, and the opening hole (second opening hole) 47B is formed at an end portion close to the side wall 8D in the lateral direction. Therefore, the opening holes 47A and 47B are spaced apart from each other in the lateral direction of the secondary battery 1.

The opening holes 47A and 47B are used to discharge gas from the accommodating space 11 to the outside of the container 3 in manufacturing of the secondary battery 1. At this time, the gas is discharged from the accommodating space 11 to the outside by passing through a gap between the flange 13 and the second container member 6 and any one of the opening holes 47A and 47B in this order. The opening hole 47A is spaced apart from the edge 15 of the opening 12 by a distance D1a, and the opening hole 47B is spaced apart from the edge 15 of the opening 12 by a distance D1b. In this embodiment, the distances D1a and D1b are the same as or approximately the same as each other, and each of the distances D1a and D1b is, for example, about 20 mm. Each of the opening holes 47A and 47B has a diameter (φa and φb, respectively), and each of the diameters φa and φb is, for example, about 1 mm.

Further, in this embodiment, projections 48A and 48B are formed in one of the flange 13 and the second container member 6. In an example, the projections 48A and 48B are provided between the welding part 45A and the edge 15 of the opening 12. Each of the projections 48A and 48B projects toward the other one of the flange 13 and the second container member 6, i.e., either one of the flange 13 and the second container member 6 which is not provided with the projections 48A and 48B. In this embodiment, the projecting directions of the projections 48A and 48B coincide with or approximately coincide with the thickness direction of the secondary battery 1. In an example, for example, the projections 48A and 48B are provided on the flange 13, and each of the projections 48A and 48B projects toward the second container member 6. In an example, the projections 48A and 48B are formed at the portion protruding outward from the side wall 8A in the depth direction in the flange 13 or the second container member 6. The projection (first projection) 48A is formed at an end portion close to the side wall 8C in the lateral direction, and the projection (second projection) 48B is formed at an end portion close to the side wall 8D in the lateral direction. Thus, the projections 48A and 48B are spaced apart from each other in the lateral direction of the secondary battery 1. In the figures observing the secondary battery 1 from one side of the thickness direction, such as FIG. 5, the projections 48A and 48B are indicated in black.

In this embodiment, the projection 48A is arranged on an inner side, i.e., a side close to the opening 12, with respect to the opening hole 47A. The projection 48A is arranged in the vicinity of the opening hole 47A, and a distance D2a from the opening hole 47A to the projection 48A is 6 mm or less. Similarly, the projection 48B is arranged on an inner side, i.e., a side close to the opening 12, with respect to the opening hole 47B. The projection 48B is arranged in the vicinity of the opening hole 47B, and a distance D2b from the opening hole 47B to the projection 48B is 6 mm or less. In this embodiment, the distances D2a and D2b are the same as or approximately the same as each other. Further, the projection 48A is spaced apart from the edge 15 of the opening 12 by a distance D3a, and the projection 48B is spaced apart from the edge 15 of the opening 12 by a distance D3b. In this embodiment, the distances D3a and D3b are the same as or approximately the same as each other, and each of the distances D3a and D3b is, for example, about 4 mm.

In this embodiment, a welding part 51A which welds the flange 13 and the second container member 6 hermetically is formed between the opening hole 47A and the projection 48A. The welding part 51A is extended in a state of being inclined with respect to the depth direction and the lateral direction of the secondary battery 1. One end of the welding part 51A is continuous with the welding part 45A, and the other end thereof is continuous with the welding part 45C. The welding part 51A is formed after discharging the gas from the opening hole 47A to the outside in the manufacturing of the secondary battery 1. The welding part 51A blocks the gas path between the opening hole 47A and the projection 48A. Similarly, a welding part 51B which welds the flange 13 and the second container member 6 hermetically is formed between the opening hole 47B and the projection 48B. The welding part 51B is extended in a state of being inclined with respect to the depth direction and the lateral direction of the secondary battery 1. One end of the welding part 51B is continuous with the welding part 45A, and the other end thereof is continuous with the welding part 45D. The welding part 51B is formed after discharging the gas from the opening hole 47B to the outside in the manufacturing of the secondary battery 1. The welding part 51B blocks the gas path between the opening hole 47B and the projection 48B. The welding parts 51A and 51B are formed by, for example, resistance seam welding, in the same manner as the welding part 45. In the figures observing the secondary battery 1 from one side of the thickness direction, such as FIG. 5, the welding parts 51A and 51B are indicated by broken lines.

Since the welding parts 45A to 45D, 51A, and 51B are formed as described above, in this embodiment, the flange 13 and the second container member 6 are hermetically welded to each other over the entire perimeter in the circumferential direction of the opening 12 by the welding parts 45A to 45D, 51A, and 51B. In this embodiment, the welding part 51A is located on an inner side, i.e., a side close to the opening 12, with respect to the opening hole 47A. The welding part 51B is located on an inner side, i.e., a side close to the opening 12, with respect to the opening hole 47B. Thus, the accommodating space 11 accommodating the electrode group 10 is sealed off from the outside of the container 3.

In an example, after forming the welding part 51A at the time of manufacturing, a portion located an outer side relative to the welding part 51A in the flange 13 and the second container member 6 is cut out. Thus, the opening hole 47A is removed so as not to be provided in the manufactured secondary battery 1. Similarly, in an example, after forming the welding part 51B at the time of manufacturing, a portion located an outer side relative to the welding part 51B in the flange 13 and the second container member 6 is cut out. Thus, the opening hole 47B is removed so as not to be provided in the manufactured secondary battery 1. In an example, at the time of manufacturing, the portion on the outer side relative to the welding part 51A and the portion on the outer side relative to the welding part 51B are cut out, and both the opening holes 47A and 47B are not provided in the manufactured secondary battery 1. In these examples, in the manufactured secondary battery 1, the flange 13 and the second container member 6 are hermetically welded over the entire perimeter in the circumferential direction of the opening 12 by the welding parts 45A to 45D, 51A, and 51B. Therefore, the accommodating space 11 is sealed off from the outside of the container 3. Also in these examples, the projections 48A and 48B are provided on the inner side, i.e., the side close to the opening 12, with respect to the welding parts 45A, 51A, and 512.

In this embodiment, a gap is formed between the flange 13 and the second container member 6 over the whole or the majority of areas on the inner side of the welding parts 45A to 45D, 51A, and 51B and on the outer side of the edge of the opening 12 in a state in which an internal pressure (pressure of the accommodating space 11) inside the container 3 is the same as or approximately the same as an external pressure outside the container 3. At this time, in the areas on the inner side of the welding parts 45A to 45D, 51A, and 51B and the outer side of the edge 15 of the opening 12, for example, at portions other than projecting ends of the projections 48A and 48B, the flange 13 has a gap with the second container member 6, and does not adhere to the second container member 6.

Figure 6A:
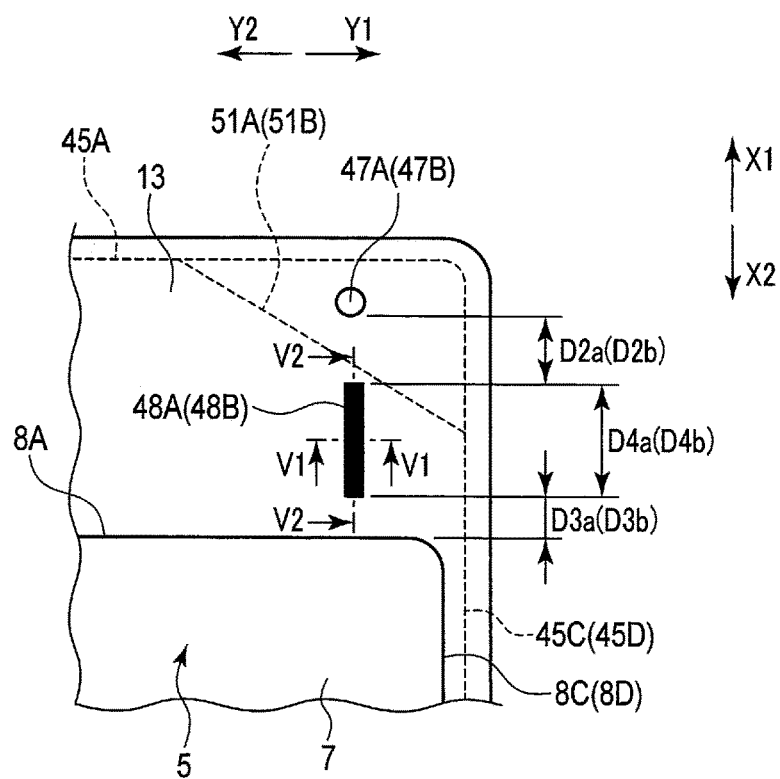
FIG. 6A is a schematic diagram showing a configuration of a projection and the vicinity thereof in a first example of the first embodiment.
Figure 6B:
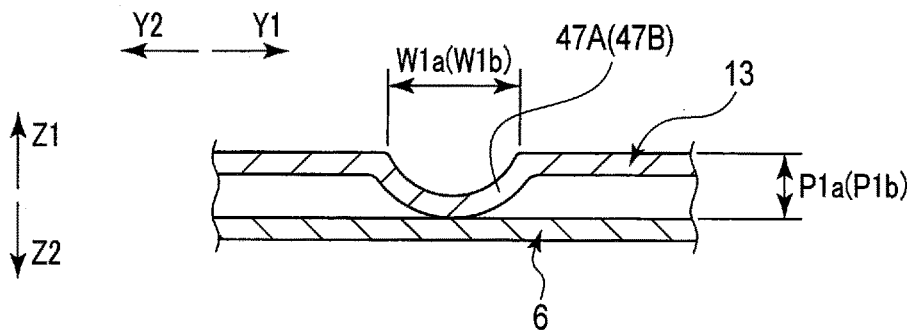
FIG. 6B is a cross-sectional view schematically showing a V1-V1 cross section of FIG. 6A in a state in which an internal pressure inside a container is the same as or approximately the same as an external pressure outside the container in the first example.
Figure 6C:
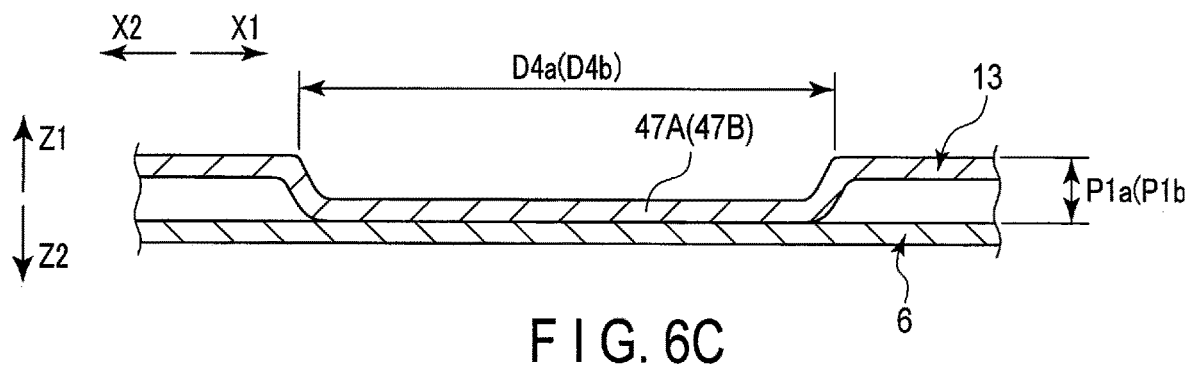
FIG. 6C is a cross-sectional view schematically showing a V2-V2 cross section of FIG. 6A in a state in which the internal pressure inside the container is the same as or approximately the same as the external pressure outside the container in the first example.

Next, configurations of the projections 48A and 48B will be described. FIGS. 6A to 6C show a configuration of the projection 48A (48B) and the vicinity thereof in a first example of this embodiment. FIG. 6B shows a V1-V1 cross section of FIG. 6A, and FIG. 6C shows a V2-V2 cross section of FIG. 6A. FIGS. 6B and 6C show a state in which the internal pressure inside the container 3 is the same as or approximately the same as the external pressure outside the container 3. In this example, each of the projections 48A and 48B is formed in a tunnel vault form. In each of the projections 48A and 48B, a longitudinal direction (tunnel axis direction), a width direction perpendicular to or approximately perpendicular to the longitudinal direction, and a projecting direction perpendicular to or approximately perpendicular to the longitudinal direction and perpendicular to or approximately perpendicular to the width direction, are defined. In this example, the longitudinal direction of each of the projections 48A and 48B coincides with or approximately coincides with the depth direction of the secondary battery 1, and the width direction of each of the projections 48A and 48B coincides with or approximately coincides with the lateral direction of the secondary battery 1. In FIG. 6B, the projection 48A (48B) is shown in a cross section perpendicular to or approximately perpendicular to the longitudinal direction, and in FIG. 6C, the projection 48A (48B) is shown in a cross section parallel to or approximately parallel to the longitudinal direction and perpendicular to or approximately perpendicular to the width direction.

In each of the projections 48A and 48B, a cross-sectional shape perpendicular to or approximately perpendicular to the longitudinal direction is uniform or approximately uniform over the entire length in the longitudinal direction. In this example, the cross-sectional shape of each of the projections 48A and 48B that is perpendicular to or approximately perpendicular to the longitudinal direction is an approximately U shape or an approximately half-arc shape. Each of the projections 48A and 48B has a dimension (D4$a$ and D4$b$, respectively) in the longitudinal direction. The dimensions D4$a$ and D4$b$ are the same as or approximately the same as each other, and each of the dimensions D4$a$ and D4$b$ is, for example, about 10 mm. Further, each of the projections 48A and 48B has a width (W1$a$ and W1$b$, respectively) in the width direction. The widths W1$a$ and W1$b$ are the same as or approximately the same as each other, and each of the widths W1$a$ and W1$b$ is, for example, about 1.2 mm. Each of the projections 48A and 48B has a projecting dimension (P1$a$ and P1$b$, respectively) to a projecting end. The projecting dimensions P1$a$ and P1$b$ are the same as or approximately the same as each other, and each of the projecting dimensions P1$a$ and P1$b$ is, for example, about 0.4 mm.

Figure 7A:
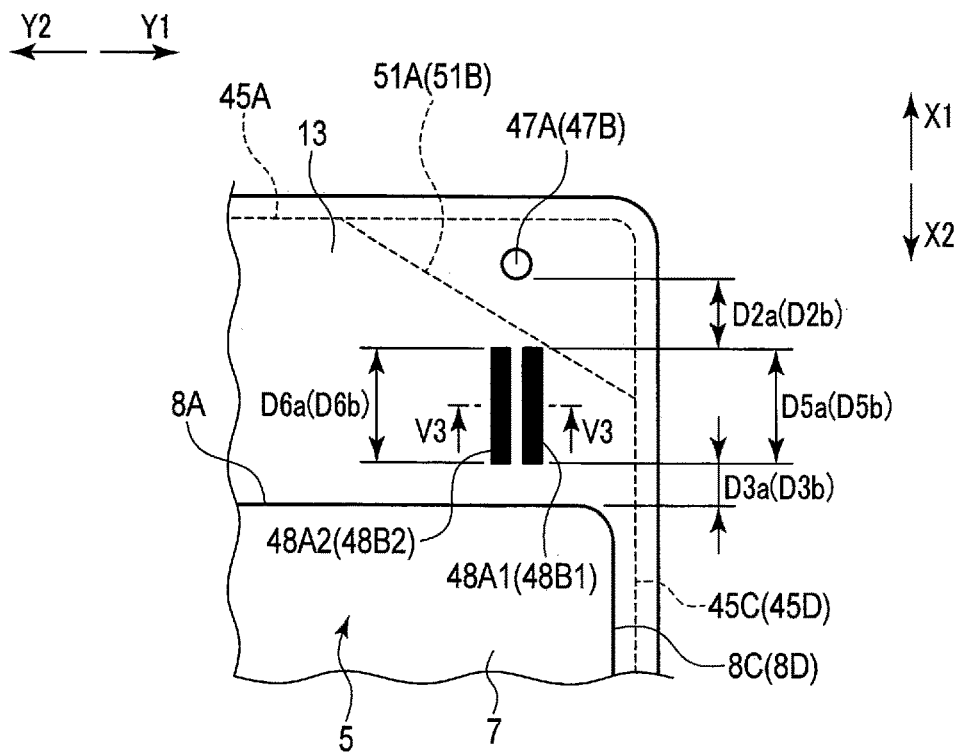
FIG. 7A is a schematic diagram showing a configuration of a projection and the vicinity thereof in a second example of the first embodiment.
Figure 7B:
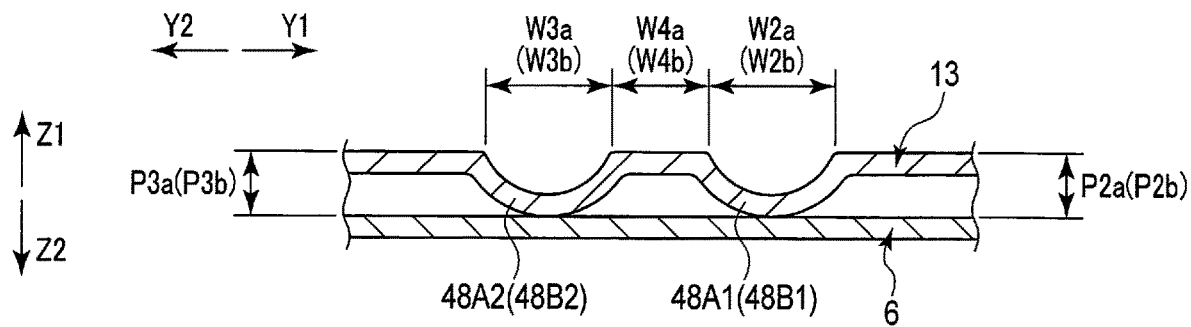
FIG. 7B is a cross-sectional view schematically showing a V3-V3 cross section of FIG. 7A in a state in which the internal pressure inside the container is the same as or approximately the same as the external pressure outside the container in the second example.

In a second example shown in FIGS. 7A and 7B, two (plural) projections 48A1 and 48A2 are formed as the projection 48A, and two (plural) projections 48B1 and 48B2 are formed as the projection 48B. FIGS. 7A and 7B show a configuration of the projections 48A1 and 48A2 (48B1 and 48B2) and the vicinity thereof. FIG. 7B shows a V3-V3 cross section of FIG. 7A, and shows a state in which the internal pressure inside the container 3 is the same as or approximately the same as the external pressure outside the container 3. In this example, each of the projections 48A1, 48A2, 48B1 and 48B2 is formed in a tunnel vault form in the same manner as the projections 48A and 48B of the first example, and the longitudinal direction, the width direction, and the projecting direction are defined in each of the projections 48A1, 48A2, 48B1 and 48B2. The longitudinal direction of each of the projections 48A1, 48A2, 48B1 and 48B2 coincides with or approximately coincides with the depth direction of the secondary battery 1, and the width direction of each of the projections 48A1, 48A2, 48B1 and 48B2 coincides or approximately coincides with the lateral direction of the secondary battery 1. In each of the projections 48A1, 48A2, 48B1 and 48B2, a cross-sectional shape perpendicular to or approximately perpendicular to the longitudinal direction is uniform or approximately uniform over the entire length in the longitudinal direction. In this example, the cross-sectional shape of each of the projections 48A1, 48A2, 48B1 and 48B2 that is perpendicular to or approximately perpendicular to the longitudinal direction is an approximately U shape or an approximately half-arc shape. In FIG. 7B, each of the projections 48A1 and 48A2 (48B1 and 48B2) is shown in a cross section perpendicular to or approximately perpendicular to the longitudinal direction.

The projections 48A1 and 48A2 are close to each other, and the projection 48A1 is formed in the vicinity of the projection 48A2. The projections 48A1 and 48A2 are extended along the longitudinal direction in parallel to or approximately in parallel to each other. The projections 48A1 and 48A2 are aligned along a specific direction. In this example, the specific direction in which the projections 48A1 and 48A2 are aligned coincides with or approximately coincides with the lateral direction of the secondary battery 1, and is perpendicular to or approximately perpendicular to the longitudinal direction of each of the projections 48A1 and 48A2. The projections 48A1 and 48A2 are extended over ranges that are the same as or approximately the same as each other in the depth direction of the secondary battery 1. Similarly, the projections 48B1 and 48B2 are close to each other, and the projection 48B1 is formed in the vicinity of the projection 48B2. The projections 48B1 and 48B2 are extended along the longitudinal direction in parallel to or approximately in parallel to each other. Further, the projections 48B1 and 48B2 are aligned along a specific direction. In this example, the specific direction in which the projections 48B1 and 48B2 are aligned coincides with or approximately coincides with the lateral direction of the secondary battery 1, and is perpendicular to or approximately perpendicular to the longitudinal direction of each of the projections 48B1 and 48B2. The projections 48B1 and 48B2 are extended over ranges that are the same as or approximately the same as each other in the depth direction of the secondary battery 1.

Each of the projections 48A1, 48A2, 48B1 and 48B2 has a dimension (D5$a$, D6$a$, D5$b$, and D6$b$, respectively) in the longitudinal direction. The dimensions D5$a$, D6$a$, D5$b$ and D6$b$ are the same as or approximately the same as one another, and each of the dimensions D5$a$, D6$a$, D5$b$ and D6$b$ is, for example, about 10 mm. Further, each of the projections 48A1, 48A2, 48B1 and 48B2 has a width (W2$a$, W3$a$, W2$b$, and W3$b$, respectively) in the width direction. The widths W2$a$, W3$a$, W2$b$ and W3$b$ are the same as or approximately the same as one another, and each of the widths W2$a$, W3$a$, W2$b$ and W3$b$ is, for example, about 1.2 mm. Each of the projections 48A1, 48A2, 48B1 and 48B2 has a projecting dimension (P2$a$, P3$a$, P2$b$, and P3$b$, respectively) to a projecting end. The projecting dimensions P2$a$, P3$a$, P2$b$ and P3$b$ are the same as or approximately the same as one another, and each of the projecting dimensions P2*a*, P3*a*, P2*b*, and P3*b* is, for example, about 0.6 mm. The projections 48A1 and 48A2 are spaced apart from each other by a separation distance W4*a* in a predetermined direction in which the projections 48A1 and 48A2 are aligned, i.e., in the lateral direction of the secondary battery 1 in this example. Similarly, the projections 48B1 and 48B2 are spaced apart from each other by a separation distance W4*b* in a predetermined direction in which the projections 48B1 and 48B2 are aligned, i.e., in the lateral direction of the secondary battery 1 in this example. The separation distances W4*a* and W4*b* are the same as or approximately the same as each other, and each of the widths W4*a* and W4*b* is, for example, about 0.6 mm.

Figure 8A:
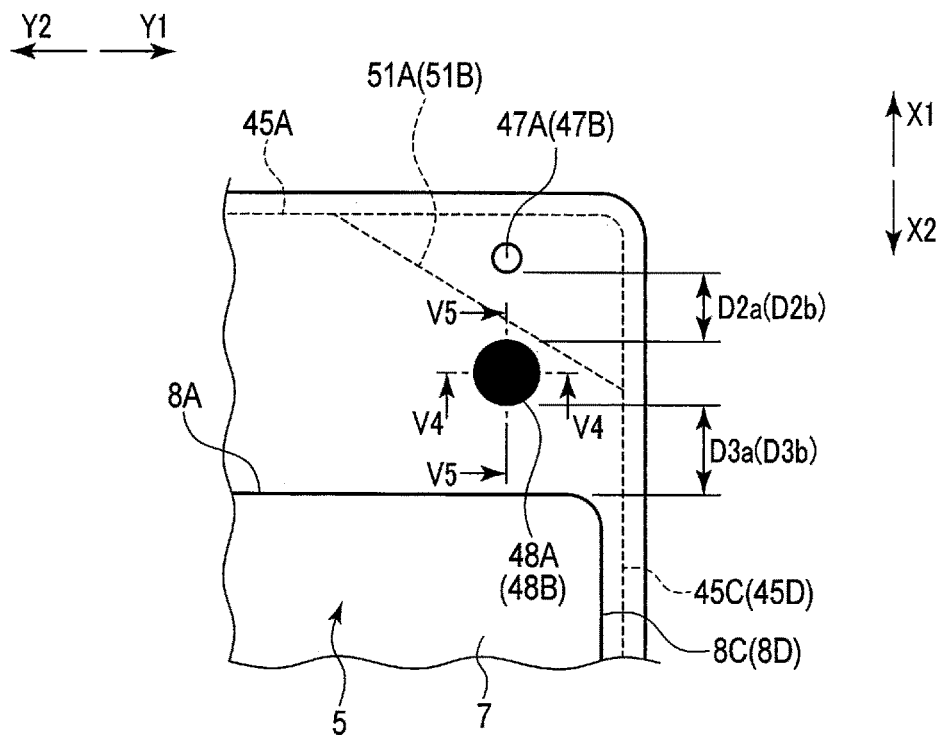
FIG. 8A is a schematic diagram showing a configuration of a projection and the vicinity thereof in a third example of the first embodiment.
Figure 8B:
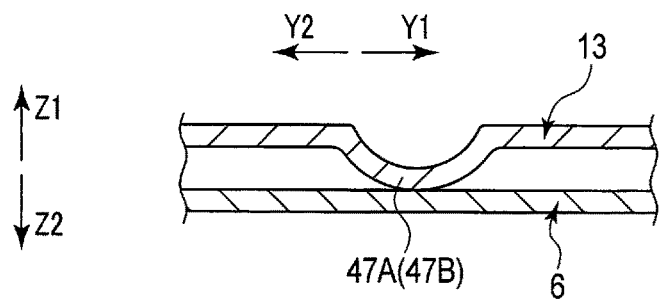
FIG. 8B is a cross-sectional view schematically showing a V4-V4 cross section of FIG. 8A in a state in which the internal pressure inside the container is the same as or approximately the same as the external pressure outside the container in the third example.
Figure 8C:
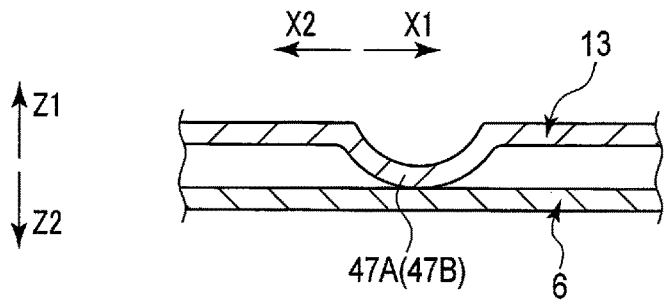
FIG. 8C is a cross-sectional view schematically showing a V5-V5 cross section of FIG. 8A in a state in which the internal pressure inside the container is the same as or approximately the same as the external pressure outside the container in the third example.

In a third example shown in FIGS. 8A to 8C, each of the projections 48A and 48B is formed in a dome shape. FIGS. 8A to 8C show a configuration of the projection 48A (48B) and the vicinity thereof. FIG. 8B shows a V4-V4 cross section of FIG. 8A, and FIG. 8C shows a V5-V5 cross section of FIG. 8A. The cross section of FIG. 8B and the cross section of FIG. 8C are cross sections parallel to or approximately parallel to the projecting direction of the projection 48A (48B), and are perpendicular to or approximately perpendicular to each other. FIGS. 8B and 8C show a state in which the internal pressure inside the container 3 is the same as or approximately the same as the external pressure outside the container 3. In this example, as described above, each of the projections 48A and 48B is formed in a dome shape. Thus, as shown in FIG. 8B, a cross-sectional shape of each of the projections 48A and 48B that is perpendicular to or approximately perpendicular to the depth direction of the secondary battery 1 is an approximately U shape or an approximately half-arc shape. Then, as shown in FIG. 8C, a cross-sectional shape of each of the projections 48A and 48B that is perpendicular to or approximately perpendicular to the lateral direction of the secondary battery 1 is an approximately U shape or an approximately half-arc shape. That is, in each of the projections 48A and 48B, the cross-sectional shape is a U shape or an approximately half-arc shape in any cross sections parallel to or approximately parallel to the projecting direction.

Figure 9:
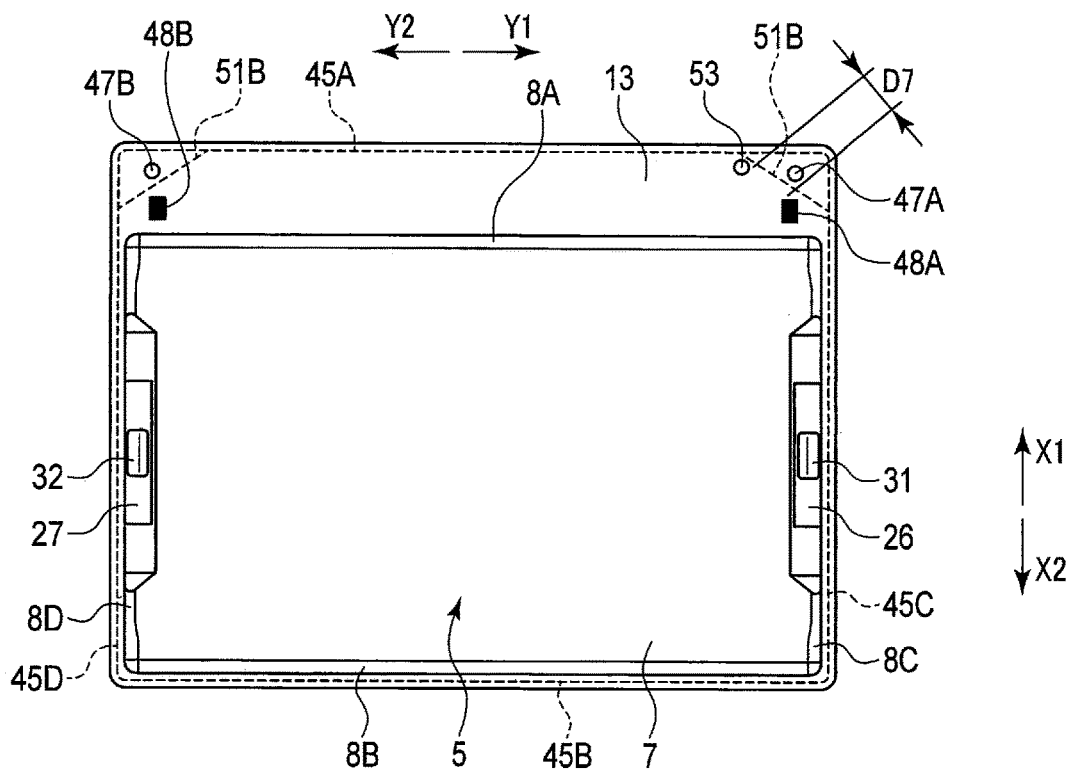
FIG. 9 is a schematic diagram showing a state in which an opening hole is formed in one of a flange and the second container member in a recycling of the secondary battery according to the first embodiment.

Next, the operation and advantageous effect of the secondary battery 1 of the present embodiment will be described. In the secondary battery 1, gas may be generated in the accommodating space 11 accommodating the electrode group 10, for example, in a case of use for a long time. In this case, in order to suppress an influence of the generated gas on the performance of the secondary battery 1, it is necessary to discharge the gas to the outside of the container 3 to restore the secondary battery 1. When restoring the secondary battery 1, an opening hole 53 is formed in one of the flange 13 and the second container member 6, as shown in FIG. 9. At this time, the opening hole 53 is formed on an inner side, i.e., a side close to the opening 12, with respect to the welding parts 45A, 51A, and 51B. Then, the opening hole 53 is formed on an outer side, i.e., a side far from the opening 12, with respect to the projections 48A and 48B. Therefore, an operator forms the opening hole 53 between the welding parts 45A, 51A, and 51B and the projections 48A and 48B.

Further, the operator forms the opening hole 53 in the vicinity of the projection (48A or 48B). At this time, the opening hole 53 is formed to be in a state in which a distance D7 from the projection (48A or 48B) to the opening hole 53 is 6 mm or less. In an example of FIG. 9, the opening hole 53 is formed in the vicinity of the projection 48A. In formation of the opening hole 53, a through hole is first formed in both of the flange 13 and the second container member 6. Then, one of the two through holes is hermetically closed. Thereby, one of the two through holes that is not closed is used as the opening hole 53.

Figure 10:
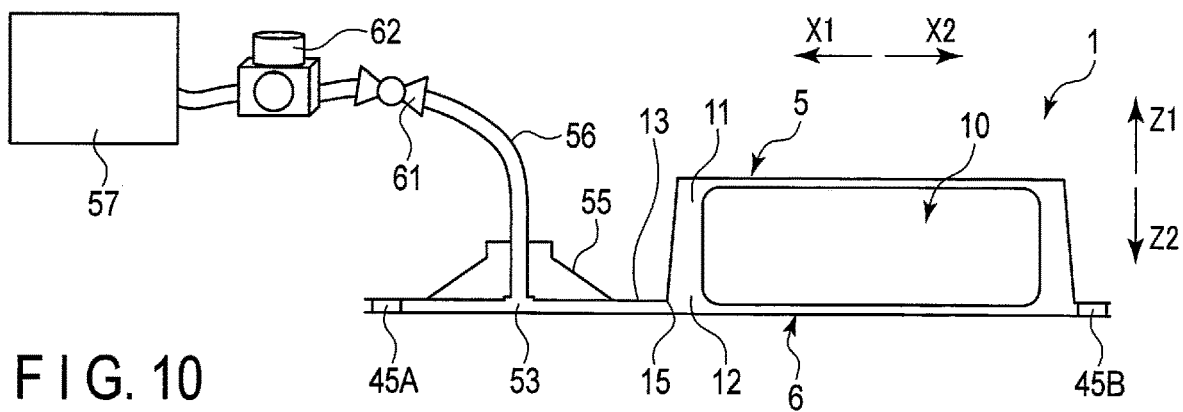
FIG. 10 is a schematic diagram showing a state in which gas is discharged from the formed opening hole to the outside of the container in the recycling of the secondary battery according to the first embodiment.

After forming the opening hole 53, the gas in the accommodating space 11 is discharged from the opening hole 53 to the outside of the container 3. At this time, as shown in FIG. 10, a suction pad 55 is attached to an outer surface of the container 3 at the opening hole 53. The suction pad 55 is connected to a pump 57, such as a vacuum pump, via a suction tube 56. A valve 61 and a vacuum regulator 62 are arranged in a suction path between the pump 57 and the suction pad 55. When discharging the gas from the opening hole 53, after the suction pad 55 is attached to the container 3, the pump 57 is driven, and the valve 61 is opened. Thereby, inside the container 3, the gas flows from the accommodating space 11 to the opening hole 53 through the gap between the flange 13 and the second container member 6. Then, the gas is sucked into the suction tube 56 from the opening hole 53, and the gas flows toward the pump 57 through the inside of the suction tube 56. Thereby, the gas is discharged from the opening hole 53 to the outside of the container 3. The discharge from the opening hole 53 is carried out in an environment in which the dew point temperature is −50° C. or less.

When the gas is discharged to the outside of the container 3 and the internal pressure inside the container 3 such as the pressure of the accommodating space 11 drops to some extent, the flange 13 and the second container member 6 are hermetically welded between the opening hole 53 and the projection (corresponding one of 48A and 48B), as shown in FIG. 11. Thereby, a welding part 63 is formed between the opening hole 53 and the projection (the corresponding one of 48A and 48B). In an example of FIG. 11, since the opening hole 53 is formed in the vicinity of the projection 48A, the welding part 63 is formed between the opening hole 53 and the projection 48A. The welding part 63 is extended in a state of being inclined with respect to the depth direction and the lateral direction of the secondary battery 1, and both ends of the welding part 63 are continuous with any ones of the welding parts 45A to 45D, 51A, and 51B. In the example of FIG. 11, one end of the welding part 63 is continuous with the welding part 45A, and the other end thereof is continuous with the welding part 51A. By forming the welding part 63, the gas path is blocked between the opening hole 47A and the projection (the corresponding one of 48A and 48B). The welding part 63 is formed by, for example, resistance seam welding, in the same manner as the welding parts 45A to 45D, 51A, and 51B. In FIG. 11, the welding part 63 is indicated by a broken line.

By forming the welding part 63, the flange 13 and the second container member 6 are hermetically welded over the entire perimeter in the circumferential direction of the opening 12 by the welding parts 45A to 45D, 51A, 51B, and 63 at a portion on an inner side relative to the opening hole 53. That is, the welding parts 45A to 45D, 51A, 51B, and 63 weld the flange 13 and the second container member 6 hermetically over the entire perimeter in the circumferential direction of the opening 12 at a portion on a side close to the opening 12 with respect to the opening hole 53. Thereby, the accommodating space 11 accommodating the electrode group 10 is again sealed off from the outside of the container 3. In an example, after forming the welding part 63, a portion on an outer side relative to the welding part 63 in the flange 13 and the second container member 6 is cut out. Thus, the opening hole 53 is removed so as not to be provided in the recycled secondary battery 1. As described above, the gas generated in the accommodating space 11 is discharged to the outside of the container 3 so that the secondary battery 1 is recycled.

In the recycling of the secondary battery 1, when the gas is discharged to the outside of the container 3, the pressure of the accommodating space 11, i.e., the internal pressure inside the container 3, decreases. Thus, the internal pressure inside the container 3 becomes lower than the external pressure outside the container 3. When the internal pressure becomes lower than the external pressure, the flange 13 and the second container member 6 are adhered to each other at a portion away from the projections 48A and 48B. However, in this embodiment, the projections 48A and 48B are provided in one of the flange 13 and the second container member 6, and the flange 13 and the second container member 6 are made of stainless steel. Thus, even in a state in which the internal pressure is lower than the external pressure, in the vicinity of the projecting end of the projection 48A, the flange 13 has a gap with respect to the second container member 6 and does not adhere to the second container member 6. Similarly, even in a state in which the internal pressure is lower than the external pressure, the flange 13 has a gap with respect to the second container member 6 and does not adhere to the second container member 6 in the vicinity of the projecting end of the projection 48B. At this time, at the projecting end of each of the projections 48A and 48B, the flange 13 abuts against the second container member 6.

FIG. 12 shows the V1-V1 cross section of FIG. 6A in a state in which the internal pressure inside the container 3 is lower than the external pressure outside the container 3 in the above-described configuration of the first example. As shown in FIG. 12, in the first example, even if the internal pressure becomes lower than the external pressure, the flange 13 has a gap with respect to the second container member 6 and does not adhere to the second container member 6 in the vicinity of the projecting end of each of the projections 48A and 48B. Also in a third example, similarly to the first example, even if the internal pressure becomes lower than the external pressure, the flange 13 has a gap with respect to the second container member 6 and does not adhere to the second container member 6 in the vicinity of the projecting end of each of the projections 48A and 48B.

In the present embodiment in which the projections 48A and 48B are provided as described above, regardless of the magnitude of the external pressure and the internal pressure, the flange 13 has a gap with respect to the second container member 6 and does not adhere to the second container member 6 in the vicinity of the projecting end of each of the projections 48A and 48B. Thus, even if the internal pressure becomes lower than the external pressure by the suction from the opening hole 53, the gas path is secured without being blocked in the vicinity of the projecting end of each of the projections 48A and 48B. Thereby, even in a state in which the internal pressure is lower than the external pressure, the gas path from the accommodating space 11 to the opening hole 53 is not blocked so that the gas easily flows from the accommodating space 11 into the opening hole 53 through the vicinity of the projecting end of the projection (corresponding one of 48A and 48B). Therefore, even if the internal pressure becomes lower than the external pressure, the gas reaches the opening hole 53, and is discharged appropriately from the opening hole 53. The gas is appropriately discharged from the opening hole 53 as described above so that the secondary battery 1 is properly recycled. Thereby, an influence on the secondary battery 1 of the gas generated during use is appropriately suppressed.

FIG. 13 shows the V3-V3 cross section of FIG. 7A in a state in which the internal pressure inside the container 3 is lower than the external pressure outside the container 3 in the above-described configuration of the second example. As shown in FIG. 13, also in the second example in the same manner as the first and third examples, even if the internal pressure becomes lower than the external pressure, the flange 13 has a gap with respect to the second container member 6 and does not adhere to the second container member 6 in the vicinity of the projecting end of each of the projections 48A1, 48A2, 48B1 and 48B2. Thus, as described above, even if the internal pressure becomes lower than the external pressure, the gas reaches the opening hole 53 and is appropriately discharged from the opening hole 53.

Further, in the second example, the projections 48A1 and 48A2 are close to each other, so that the gap of the flange 13 with respect to the second container member 6 is kept large between the projecting ends of the projections 48A1 and 48A2 even if the internal pressure becomes lower than the external pressure. Similarly, in the second example, the projections 48B1 and 48B2 are close to each other, so that the gap of the flange 13 with respect to the second container member 6 is kept large between the projecting ends of the projections 48B1 and 48B2 even if the internal pressure becomes lower than the external pressure. Thus, in the second example, the gas flows more easily from the accommodating space 11 to the opening hole 53 through the vicinity of the projecting ends of the projections 48A1 and 48A2 or the vicinity of the projecting ends of the projections 48B1 and 48B2 in a state in which the internal pressure is lower than the external pressure. Thus, in the second example, the gas is discharged more effectively to the outside of the container 3 from the opening hole 53.

(Verification Related to Embodiments)

Figure 14:
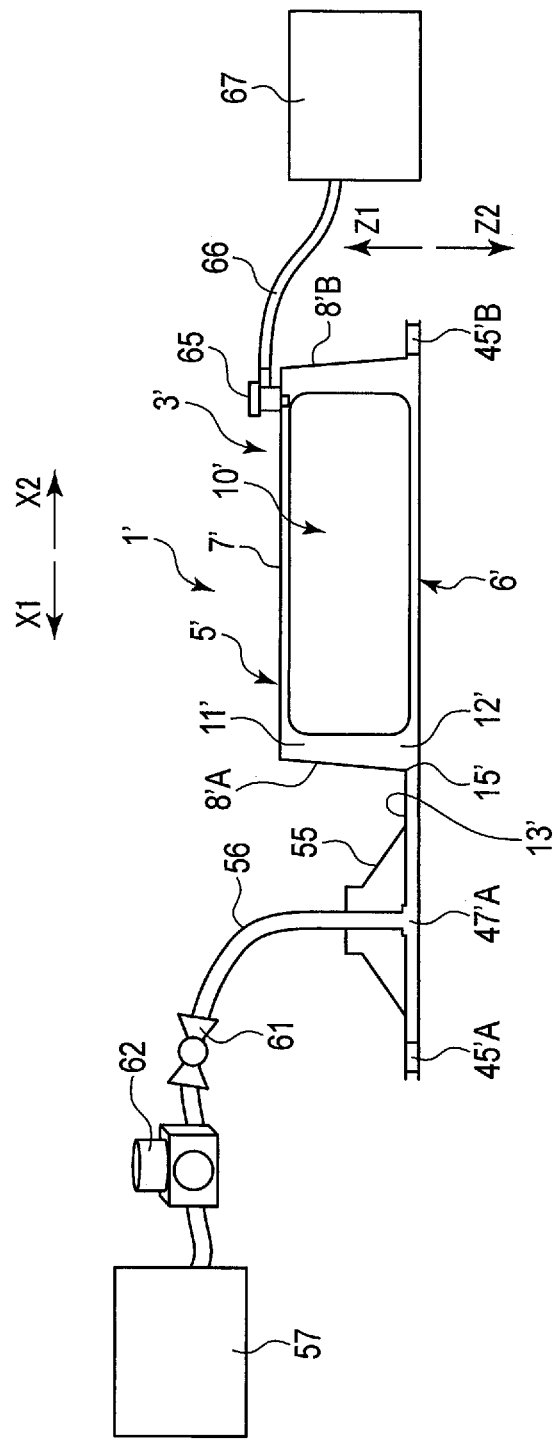
FIG. 14 is a schematic diagram showing a system used for verification of a decompression state of an accommodating space of the secondary battery according to the first embodiment.

The operation and advantageous effect of the above-described embodiment were verified. FIG. 14 shows a system used for verification of a decompression state of the accommodating space 11 of the secondary battery 1. As shown in FIG. 14, a subject 1' which imitates the above-described secondary battery 1 was formed in the verification. In the subject 1', a container 3' was formed by a first container member 5' and a second container member 6' that are made of stainless steel. In the first container member 5', a bottom wall 7' and side walls 8'A to 8'D were formed in the same manner as the above-described first container member 5 to define an accommodating space 11'. Similarly to the first container member 5, the accommodating space 11' was opened with an opening 12'. Then, a flange 13' was formed in the first container member 5', and an edge 15' of the opening 12' of the accommodating space 11' was defined by the flange 13', in the same manner as the first container member 5. The second container member 6' was formed in a plate shape in the same manner as the above-described second container member 6. Then, the second container member 6' was arranged to face the flange 13', and the opening 12' was blocked by the second container member 6'. Each of the first container member 5' and the second container member 6' was formed to be 0.1 mm thick. In the subject 1', an accommodated body 10' which imitates the above-described electrode group 10 was accommodated in the accommodating space 11'.

In the subject 1', welding parts 45'A to 45'D similar to the above-described welding parts 45A to 45D were formed by resistance seam welding, and the flange 13' and the second container member 6' were hermetically welded over the entire perimeter in the circumferential direction of the opening 12'. In the subject 1', the opening hole 47'A was formed at the same position as that of the above-described opening hole 47A in the flange 13'. The opening hole 47'A was formed on an inner side relative to the welding part 45'A. The opening hole 47'A was formed to be 1 mm in diameter φ'a, and a distance D'1a from the edge 15' of the opening 12' to the opening hole 47'A was set to 20 mm. In the subject 1', opening holes corresponding to the above-described opening holes 47B and 53, a projection corresponding to the above-described projection 48B (including 48B1 and 48B2), and welding parts corresponding to the above-described welding parts 51A, 51B and 63, were not formed.

In the verification, gas of the accommodating space 11' was discharged from the opening hole 47'A to the outside of the container 3'. The gas discharge was carried out in an environment where the dew point temperature was −60° C. At this time, in the same manner as the above-described recycling of the secondary battery 1, the gas was discharged to the outside of the container 3' by using the suction pad 55, the suction tube 56, the pump 57, the valve 61, and the vacuum regulator 62. As the suction pad 55, a flat pad, model ZP2-B10MTF manufactured by MISUMI Corporation, was used. As the pump 57, model DA41D manufactured by ULVAC Inc. and having a practical pumping speed of 40 L/min (0.67 L/sec), an ultimate pressure of −98 kPa, and a setting pressure of the vacuum regulator 62 of −100 kPa was used. In the verification, an attachment 65 was attached to the bottom wall 7' of the first container member 5', and the attachment 65 was connected to a pressure sensor 67 via a tube 66. Then, in a state of performing the gas discharge from the opening hole 47'A, a pressure of the accommodating space 11', i.e., an internal pressure inside the container 3', was measured by the pressure sensor 67. The attachment 65 was attached to a position diagonal to the opening hole 47'A, i.e., in the vicinity of a corner formed by the side walls 8'B and 8'D. As the attachment 65, model M3-ALU-4 manufactured by SMC Corporation was used. As the pressure sensor 67, model AP-10S manufactured by KEYENCE CORPORATION and having a rated pressure range of ±100 kPa was used.

In the verification, the gas was discharged from the opening hole 47'A under three conditions α1 to α3, and a change of a decompression degree ε of the accommodating space 11' over time from a start of the gas discharge was measured. The measurement of the change of the decompression degree ε over time was performed twice under each of the conditions α1 to α3. Here, under the condition α1, only the opening hole 47'A was provided in an area on an outer side relative to the edge 15' of the opening 12' and on an inner side relative to the welding parts 45'A to 45'D. Thus, under the condition α1, a configuration corresponding to the above-described projection 48A (including 48A1 and 48A2), etc. was not provided. Under the condition α2, in addition to the opening hole 47'A, the projection 48'A similar to the above-described projection 48A (see FIGS. 6A to 6C) of the first example was provided in the flange 13' in an area on the outer side relative to the edge 15' of the opening 12' and on the inner side relative the welding parts 45'A to 45'D. The projection 48'A was formed in a tunnel vault form similar to the projection 48A, and was formed at a position similar to that of the projection 48A. Further, the projection 48'A was formed with a dimension D'4a in the longitudinal direction of 10 mm and a width W'1a in the width direction of 1.2 mm. Then, the projection 48'A was formed with a projecting dimension P'1a of 0.4 mm. Further, a distance D'2a from the projection 48'A to the opening hole 47'A was set to 6 mm, and a distance D'3a from the edge 15' of the opening 12' to the projection 48'A was set to 4 mm.

Under the condition α3, in addition to the opening hole 47'A, projections 48'A1 and 48'A2 similar to the above-described projections 48A1 and 48A2 (see FIGS. 7A and 7B) of the second example were provided in the flange 13' in an area on the outer side relative to the edge 15' of the opening 12' and on the inner side relative to the welding parts 45'A to 45'D. The projection 48'A1 was formed in a tunnel vault form similar to the projection 48A1, and was formed at a position similar to that of the projection 48A1. Then, the projection 48'A2 was formed in a tunnel vault form similar to the projection 48A2, and was formed at a position similar to that of the projection 48A2. Each of the projections 48'A1 and 48'A2 was formed with a dimension (D'5a and D'6a, respectively) in the longitudinal direction of 10 mm and a width (W'2a and W'3a, respectively) in the width direction of 1.2 mm. Each of the projections 48'A and 48'A2 was formed with a projecting dimension (P'2a and P'3a, respectively) of 0.6 mm. The distance D'2a from the projections 48'A1 and 48'A2 to the opening hole 47'A was set to 6 mm, and the distance D'3a from the edge 15' of the opening 12' to the projections 48'A1 and 48'A2 was set to 4 mm. A separation distance W'4a between the projections 48'A1 and 48'A2 was set to 0.6 mm.

FIG. 15 shows a measurement result of a change of a decompression degree ε over time of the accommodating space 11' in the verification. In FIG. 15, an abscissa axis indicates a time t with a start of the gas discharge from the opening hole 47'A as a reference, and an ordinate axis indicates the decompression degree ε. In addition, FIG. 15 shows changes of the decompression degree ε over time in a first measurement under the condition α1, a second measurement under the condition α1, a first measurement under the condition α2, a second measurement under the condition α2, a first measurement under the condition α3, and a second measurement under the condition α3.

As shown in FIG. 15, under the condition α1, the decompression degree ε was from −70 kPa to −60 kPa at a time when 5 minutes had elapsed from the start of the gas discharge. That is, under the condition α1, even after 5 minutes from the start of the gas discharge, the decompression degree ε did not reach −90 kPa. In the verification, after the gas was discharged for 5 minutes under the condition α1, the flange 13' and the second container member 6' were pulled away from each other by a mechanical force. At this time, the flange 13' and the second container member 6' were mechanically pulled apart between the edge 15' of the opening 12' and the opening hole 47'A. In the verification, even if the flange 13' and the second container member 6' were mechanically pulled apart, the decompression degree ε changed almost not at all and was maintained at from −70 kPa to −60 kPa. That is, even if the flange 13' and the second container member 6' were mechanically pulled apart, the decompression degree ε did not reach −90 kPa.

Under the condition α2, the decompression degree ε became −90 kPa at the time when 3 minutes had elapsed from the start of the gas discharge. Therefore, in the configuration of the first embodiment, etc. in which the projection 48A (48B) similar to the projection 48'A was provided, it has been verified that the gas reached the opening hole 53 and was appropriately discharged to the outside of the container 3 even if the internal pressure became lower than the external pressure.

Under the condition α3, the decompression degree ε became −90 kPa or less at the time when 1 minute had elapsed from the start of the gas discharge. Therefore, in the configuration of the second example in which the projections 48A1 and 48A2 (48B1 and 48B2) similar to the projections 48'A1 and 48'A2 are provided, it has been verified that the gas flows more easily from the accommodating space 11 to the opening hole 53 and is discharged to the outside of the container 3 more effectively in a state in which the internal pressure is lower than the external pressure.

(Modifications)

In the above-described embodiment, etc., only one electrode group 10 is accommodated in the accommodating space 11, but in a modification, a plurality of electrode groups are accommodated in the accommodating space 11.

In another modification, the second container member 6 is formed in a tubular shape with a bottom similar to the first container member 5, not in the plate shape. In this case, the second container member 6 also includes a bottom wall, side walls and a flange. Then, the flange 13 of the first container member 5 and the flange of the second container member 6 are welded to each other by the welding parts 45A to 45D, 51A, 51B, etc. Also in this modification, the flange 13 and the second container member 6 are hermetically welded to each other over the entire perimeter in the circumferential direction of the opening 12 by the welding parts 45A to 45D, 51A, and 51B. Then, the accommodating space 11 accommodating the electrode group 10 is sealed off from the outside of the container 3.

According to the secondary battery of at least one of these embodiments or examples, a flange of the first container member and the second container member are hermetically welded on an outer side relative to an edge of an opening of an accommodating space so that the accommodating space is sealed. Then, on one of the flange and the second container member, a projection projecting toward the other one of the flange and the second container member is provided between welding parts and the edge of the opening. Thus, it is possible to provide a secondary battery in which gas is appropriately discharged from the accommodating space to the outside in recycling so that the secondary battery is appropriately recycled, and a method of recycling the secondary battery.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A secondary battery comprising:
   a first container member including a bottom wall and side walls, and made of stainless steel, wherein an accommodating space is defined by the bottom wall and the side walls, and the accommodating space has an opening opposite to the bottom wall;
   a flange provided at a portion opposite to the bottom wall in the first container member, the flange defining an edge of the opening of the accommodating space;
   an electrode group including a positive electrode and a negative electrode, and accommodated in the accommodating space;
   a second container member made of stainless steel, and arranged to face the flange, the second container member closing the opening of the accommodating space;
   a welding part provided on an outer side relative to the edge of the opening, and hermetically welding the flange and the second container member over an entire perimeter of the opening so as to seal the accommodating space; and
   a projection provided on one of the flange and the second container member between the welding part and the edge of the opening, and projecting toward another of the flange and the second container member.

2. The secondary battery according to claim 1, wherein the projection is formed in a tunnel vault form.

3. The secondary battery according to claim 1, wherein the projection is formed in a dome shape.

4. The secondary battery according to claim 1, wherein the projection is a plurality of projections which are close to one another and which are aligned in a predetermined direction.

5. The secondary battery according to claim 4,
   wherein each of the projections is formed in a tunnel vault form,
   the projections are extended in parallel to or approximately in parallel to one another, and
   the predetermined direction in which the projections are aligned is perpendicular to or approximately perpendicular to a longitudinal direction of each of the projections.

6. The secondary battery according to claim 1, wherein a thickness of each of the first container member and the second container member is from 0.02 mm to 0.3 mm.

7. A method of recycling the secondary battery according to claim 1, comprising:
   forming an opening hole in one of the flange and the second container member between the welding part and the projection and near the projection; and
   discharging a gas in the accommodating space from the opening hole.

8. The method of recycling according to claim 7, further comprising hermetically welding the flange and the second container member between the opening hole and the projection after discharging the gas to block a path of the gas between the opening hole and the projection.

* * * * *